United States Patent
Nanba et al.

(10) Patent No.: US 7,276,560 B2
(45) Date of Patent: *Oct. 2, 2007

(54) SOLID GOLF BALL

(75) Inventors: Atsushi Nanba, Chichibu (JP); Jun Shindo, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 252 days.

This patent is subject to a terminal disclaimer.

(21) Appl. No.: 11/011,043

(22) Filed: Dec. 15, 2004

(65) Prior Publication Data

US 2006/0128900 A1    Jun. 15, 2006

(51) Int. Cl.
*A63B 37/00* (2006.01)
*A63B 37/06* (2006.01)

(52) U.S. Cl. .............. 525/261; 525/263; 525/265; 525/274; 473/371; 473/372

(58) Field of Classification Search ............. None
See application file for complete search history.

(56) References Cited

U.S. PATENT DOCUMENTS

| | | |
|---|---|---|
| 4,683,257 A | 7/1987 | Kakiuchi et al. |
| 4,929,678 A | 5/1990 | Hamada et al. |
| 4,955,613 A | 9/1990 | Gendreau et al. |
| 5,082,285 A | 1/1992 | Hamada et al. |
| 6,194,505 B1 | 2/2001 | Sone et al. |
| 6,312,346 B1 | 11/2001 | Sugimoto |
| 2003/0013555 A1* | 1/2003 | Higuchi et al. ............. 473/371 |
| 2003/0073784 A1* | 4/2003 | Ohama ....................... 525/261 |
| 2006/0199936 A1* | 9/2006 | Nanba et al. .................. 528/70 |

FOREIGN PATENT DOCUMENTS

| | | |
|---|---|---|
| JP | 62-089750 A | 4/1987 |
| JP | 63-275356 A | 11/1988 |
| JP | 2-268778 A | 11/1990 |
| JP | 3-151985 A | 6/1991 |
| JP | 11-70187 A | 3/1999 |
| JP | 11-164912 A | 6/1999 |
| JP | 11-319148 A | 11/1999 |
| JP | 2001149503 * | 6/2001 |
| JP | 2002-355341 A | 12/2002 |

* cited by examiner

*Primary Examiner*—David J. Buttner
(74) *Attorney, Agent, or Firm*—Sughrue Mion, PLLC

(57) ABSTRACT

The present invention provides a solid golf ball comprising a hot-molded product of a rubber composition comprising (a) 100 parts by weight of a polybutadiene synthesized using a rare-earth catalyst and having a cis-1,4 content of at least 60% and a 1,2 vinyl content of at most 2%, having a viscosity η at 25° C. as a 5 wt % solution in toluene of up to 600 mPa·s, and having Mooney viscosity ($ML_{1+4}$ (100° C.)) of more than 30, (b) 0.01 to 0.5 parts by weight of a sulfur, (c) 10 to 60 parts by weight of an unsaturated carboxylic acid and/or a metal salt thereof, (d) 0.1 to 5 parts by weight of an organosulfur compound, (e) 5 to 80 parts by weight of an inorganic filler, and (f) 0.1 to 5 parts by weight of an organic peroxide, wherein the hot-molded product has a difference in JIS-C hardness between the center and surface thereof of more than 20 and up to 40. The solid golf balls of the invention have a soft feel upon impact and excellent rebound characteristics. Moreover, the solid golf balls are improved in flight performance by making its spin rate reduced when shot with a driver.

2 Claims, No Drawings

SOLID GOLF BALL

BACKGROUND OF THE INVENTION

1. Field of the Invention

The present invention relates to a solid golf ball having a soft feel when hit with a golf club and good rebound characteristics.

2. Prior Art

Various improvements are being made in formulating the polybutadiene used as the base rubber in golf balls so as to confer the balls with outstanding rebound characteristics.

For example, JP-A 62-89750 describes rubber compositions for use as the base rubber in solid golf balls, which compositions are arrived at by blending a polybutadiene having a Mooney viscosity of 70 to 100 and synthesized using a nickel or cobalt catalyst with another polybutadiene having a Mooney viscosity of 30 to 90 and synthesized using a lanthanide catalyst or polybutadiene having a Mooney viscosity of 20 to 50 and synthesized using a nickel or cobalt catalyst.

However, further improvements are required in the above art to achieve solid golf balls endowed with a sufficiently soft feel and excellent rebound.

JP-A 2-268778 describes golf balls molded using a blend composed of a polybutadiene having a Mooney viscosity of less than 50 and synthesized using a Group VIII catalyst in combination with a polybutadiene having a Mooney viscosity of less than 50 and synthesized with a lanthanide catalyst. However, golf balls having both a soft feel and excellent rebound cannot be obtained in this way.

The existing art also teaches multi-piece solid golf balls in which an intermediate layer is molded of a low-Mooney viscosity polybutadiene (JP-A 11-70187), solid golf balls molded from rubber compositions comprising a polybutadiene having a Mooney viscosity of 50 to 69 and synthesized using a nickel or cobalt catalyst in combination with a polybutadiene having a Mooney viscosity of 20 to 90 and synthesized using a lanthanide catalyst (JP-A 11-319148), solid golf balls molded from compositions based on a rubber having a 1,2 vinyl content of at most 2.0% and a weight-average molecular weight to number-average molecular weight ratio Mw/Mn of not more than 3.5 (JP-A 11-164912), golf balls molded from rubber compositions containing a high Mooney viscosity polybutadiene (JP-A 63-275356), and golf balls molded from rubber compositions comprising polybutadiene having a high number-average molecular weight in admixture with polybutadiene having a low number-average molecular weight (JP-A 3-151985). Furthermore, JP-A 2002-355341 describes golf ball formed from rubber compositions wherein a sulfur are compounded into a rubber base together with a sulfur compound.

However, none of these prior-art golf balls truly achieve both a soft feel upon impact and excellent rebound characteristics.

SUMMARY OF THE INVENTION

It is therefore an object of the present invention to provide solid golf balls which are endowed with both a soft feel when hit with a golf club and excellent rebound characteristics.

The inventor has discovered that a solid golf ball comprises a hot-molded product of a rubber composition comprising (a) 100 parts by weight of a polybutadiene synthesized using a rare-earth catalyst and having a cis-1,4 content of at least 60% and a 1,2 vinyl content of at most 2%, having a viscosity $\eta$ at 25° C. as a 5 wt % solution in toluene of up to 600 mPa·s, and having Mooney viscosity ($ML_{1+4}$ (100° C.)) of more than 30, (b) 0.01 to 0.5 parts by weight of a sulfur, (c) 10 to 60 parts by weight of an unsaturated carboxylic acid and/or a metal salt thereof, (d) 0.1 to 5 parts by weight of an organosulfur compound, (e) 5 to 80 parts by weight of an inorganic filler, and (f) 0.1 to 5 parts by weight of an organic peroxide and the hot-molded product has a difference in JIS-C hardness between the center and surface thereof of more than 20 and up to 40 JIS-C hardness units so that the solid golf ball exhibits a good synergy of effects owing to optimization of the composition and hardness. Solid golf balls containing such a hot-molded product have a soft feel upon impact and outstanding rebound characteristics and the improvement of flight performance by adjusting the spin rate as small as possible when hit with a driver.

Accordingly, the invention provides the following solid golf balls.

[1] A solid golf ball comprising a hot-molded product of a rubber composition comprising (a) 100 parts by weight of a polybutadiene synthesized using a rare-earth catalyst and having a cis-1,4 content of at least 60% and a 1,2 vinyl content of at most 2%, having a viscosity $\eta$ at 25° C. as a 5 wt % solution in toluene of up to 600 mPa·s, and having Mooney viscosity ($ML_{1+4}$ (100° C.)) of more than 30, (b) 0.01 to 0.5 parts by weight of a sulfur, (c) 10 to 60 parts by weight of an unsaturated carboxylic acid and/or a metal salt thereof, (d) 0.1 to 5 parts by weight of an organosulfur compound, (e) 5 to 80 parts by weight of an inorganic filler, and (f) 0.1 to 5 parts by weight of an organic peroxide wherein the hot-molded product has a difference in JIS-C hardness between the center and surface thereof of more than 20 and up to 40.

[2] The solid golf ball of [1], wherein the amount of (f) the organic peroxide is 1.2 to 3.0 parts by weight per 100 parts by weight of the polybutadiene.

[3] The solid golf ball of [1], wherein (f) the organic peroxide includes 1,1-bis(tert-butylperoxy)cyclohexane.

DETAILED DESCRIPTION OF THE INVENTION

The solid golf ball of the invention includes as a constituent component a hot-molded product of a rubber composition in which the base rubber is polybutadiene. It is critical that the base rubber contain as component (a) a specific amount of polybutadiene in which the cis-1,4 and 1,2 vinyl contents, the viscosity $\eta$ at 25° C. as a 5 wt % solution in toluene and Mooney viscosity have each been optimized.

That is, the polybutadiene (a) has a cis-1,4 content of at least 60%, preferably at least 80%, more preferably at least 90%, and most preferably at least 95%; and has a 1,2 vinyl content of at most 2%, preferably at most 1.7%, more preferably at most 1.5%, and most preferably at most 1.3%. Outside of the above ranges, the rebound characteristics of the solid golf ball decline.

The polybutadiene (a) must also have a viscosity η at 25° C. as a 5 wt % solution in toluene of not more than 600 mPa·s. "Viscosity η at 25° C. as a 5 wt % solution in toluene" refers herein to the value in mPa·s units obtained by dissolving 2.28 g of the polybutadiene to be measured in 50 ml of toluene and carrying out measurement with a specified viscometer at 25° C. using a standard solution for the viscometer (JIS Z8809).

The polybutadiene (a) has a viscosity η at 25° C. as a 5 wt % solution in toluene of not more than 600 mPa·s, preferably not more than 550 mPa·s, more preferably not more than 500 mPa·s, even more preferably not more than 450 mPa·s, and most preferably not more than 400 mPa·s. Too high a viscosity η lowers the workability of the rubber composition. It is recommended that the viscosity η be at least 50 mPa·s, preferably at least 100 mPa·s, more preferably at least 150 mPa·s, and most preferably at least 200 mPa·s. Too low a viscosity η may lower rebound characteristics.

It is recommended that the polybutadiene (a) have a Mooney viscosity ($ML_{1+4}$, (100° C.)) of at least 30, preferably at least 40, and more preferably at least 50, but not more than 80, preferably not more than 70, more preferably not more than 65, and most preferably not more than 60.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

The polybutadiene (a) is synthesized with a rare-earth catalyst. A known rare-earth catalyst may be used for this purpose. Examples of suitable catalysts include lanthanide series rare-earth compounds, organoaluminum compounds, alumoxane, halogen-bearing compounds, optionally in combination with Lewis bases.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon residue of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

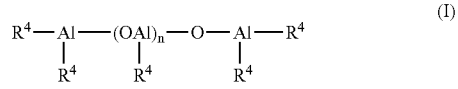
(I)

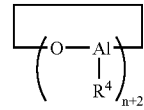
(II)

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon residue of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$ (wherein "Me" stands for methyl); and other metal halides such as silicon tetrachloride, tin tetrachloride and titanium tetrachloride.

The Lewis base may be used to form a complex with the lanthanide series rare-earth compound. Illustrative examples include acetylacetone and ketone alcohols.

In the practice of the invention, the use of a neodymium catalyst composed in part of a neodymium compound as the lanthanide series rare-earth compound is advantageous because it enables a polybutadiene rubber having a high cis-1,4 content and a low 1,2 vinyl content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of generally −30° C. to +150° C., and preferably 10° C. to 100° C.

It is also possible for the polybutadiene (a) to be obtained by polymerization with the above-described rare-earth catalyst, followed by the reaction of an end group modifier with active end groups on the polymer.

Any known end group modifier may be used. Examples include compounds of types (1) to (7) described below:

(1) A compound having one or more alkoxysilyl groups, or desirably an alkoxysilane compound having at least one epoxy group or isocyanate group in the molecule.

Examples of epoxy group containing alkoxysilane are listed below.
3-glycidyloxypropyltrimethoxysilane,
3-glycidyloxypropyltriethoxysilane,
(3-glycidyloxypropyl)methyldimethoxysilane,
(3-glycidyloxypropyl)methyldiethoxylsilane,
β-(3,4-epoxycyclohexyl)trimethoxysilane,
β-(3,4-epoxycyclohexyl)triethoxysilane,
β-(3,4-epoxycyclohexyl)methyldimethoxysilane,
β-(3,4-epoxycyclohexyl)ethyldimethoxysilane,
condensate of 3-glycidyloxypropyltrimethoxysilane, and
condensate of (3-glycidyloxypropyl)methyldimethoxysilane.

Examples of isocyanate group containing alkoxysilane are listed below.
3-isocyanatepropyltrimethoxysilane,
3-isocyanatepropyltriethoxysilane, (3-isocyanatepropyl)methyldimethoxysilane,
(3-isocyanatepropyl)methyldiethoxysilane,
condensate of 3-isocyanatepropyltrimethoxysilane, and
condensate of (3-isocyanatepropyl)methyldimethoxysilane.

Any of the alkoxysilane compounds listed above may be used in combination with a Lewis acid to enhance its reactivity when it is applied to active end groups. The Lewis acid functions as a catalyst to promote the coupling reaction, so that the resulting modified polymer has improved storage stability with less cold flow. Examples of the Lewis acid include dialkyltin dialkyl malate, dialkyltin dicarboxylate, and aluminum trialkoxide.

(2) halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain a carbonyl or ester moiety as a side chain; M' is a tin atom, silicon atom, germanium atom or phosphorus atom; X is a halogen atom; and n is an integer from 0 to 3);

(3) heterocumulene compounds containing on the molecule a Y=C=Z linkage (wherein Y is a carbon atom, oxygen atom, nitrogen atom or sulfur atom; and Z is an oxygen atom, nitrogen atom or sulfur atom);

(4) three-membered heterocyclic compounds containing on the molecule the following bonds

(wherein Y is an oxygen atom, a nitrogen atom or a sulfur atom);

(5) halogenated isocyano compounds;

(6) carboxylic acids, acid halides, ester compounds, carbonate compounds or acid anhydrides of the formulas $R^8-(COOH)_m$, $R^9(COX)_m$, $R^{10}-(COO-R^{11})$, $R^{12}-OCOO-R^{13}$, $R^{14}-(COOCO-R^{15})_m$ or the following formula

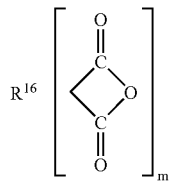

(wherein $R^8$ to $R^{16}$ are each independently a hydrocarbon group of 1 to 50 carbons; X is a halogen atom; and m is an integer from 1 to 5); and (7) carboxylic acid metal salts of the formula $R^{17}{}_1M''(OCOR^{18})_{4-1}$, $R^{19}{}_1M''(OCO-R^{20}-COOR^{21})_{4-1}$ or the following formula

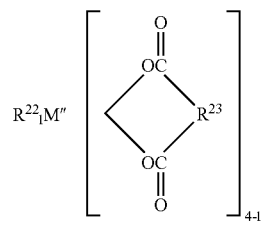

(wherein $R^{17}$ to $R^{23}$ are each independently a hydrocarbon group of 1 to 20 carbons, M'' is a tin atom, a silicon atom or a germanium atom; and 1 is an integer from 0 to 3).

Illustrative examples of the end group modifiers of types (1) to (7) above and methods for their reaction are described in, for instance, JP-A 11-35633, JP-A 7-268132 and JP-A 2002-293996.

In the practice of the invention, component (a) is included in the base rubber in an amount of at least 20 wt %, preferably at least 25 wt %, more preferably at least 30 wt %, and most preferably at least 35 wt %. The upper limit is 100 wt %, preferably not more than 90 wt %, more preferably not more than 80 wt %, and most preferably not more than 70 wt %. Too little component (a) in the base rubber makes it difficult to obtain a golf ball endowed with good rebound.

The component (b) sulfur is the necessary additives because it can make the distribution of the solid core larger described later. Examples of the sulfur used in the present invention include sulfur powder and specifically is "Sulfur Z" (dispersion type of sulfur below) by Tsurumi Chemical Industry Corporation.

The amount of the component (b) sulfur is 0.01 to 0.5 part by weight, preferably 0.01 to 0.4 part by weight, more preferably 0.01 to 0.1 parts by weight. Too low amount of sulfur makes it impossible that the distribution of the solid core be larger than the specific value to lower rebound characteristics of the core. As a result, the flight performance may be insufficient. On the other hand, too much amount of sulfur may bring that inconvenient phenomenon occurs (e.g. phenomenon such an explosion of a rubber composition when the composition being heat molded).

The hot-molded product of the invention is molded from a rubber composition containing as essential components specific amounts of (c) an unsaturated carboxylic acid and/or metal salt thereof, (d) an organosulfur compound, (e) an inorganic filler and (f) an organic peroxide per 100 parts by weight of the base rubber.

Specific examples of unsaturated carboxylic acids that may be used as component (c) include acrylic acid, methacrylic acid, maleic acid and fumaric acid. Acrylic acid and methacrylic acid are especially preferred.

Specific examples of unsaturated carboxylic acid metal salts that may be used as component (c) include the zinc and magnesium salts of unsaturated fatty acids such as zinc methacrylate and zinc acrylate. Zinc acrylate is especially preferred.

The unsaturated carboxylic acid and/or metal salt thereof used as component (c) is included in an amount, per 100 parts by weight of the base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much component (c) makes the golf ball too hard, resulting in a feel upon impact that is difficult for the player to endure. On the other hand, too little component (c) undesirably lowers rebound characteristics.

The organosulfur compound (d) of the rubber composition is essential for imparting good rebound characteristics to the golf ball. The kinds of the organosulfur compound (d) are not limited according to the present invention so long as it makes the golf ball improved in rebound characteristics. The examples include thiophenols, thionaphthols, halogenated thiophenols, and metal salts thereof, and polysulfides having 2 to 4 sulfurs. Their typical examples include pentachlorothiophenol, pentafluorothiophenol, pentabromothiophenol, p-chlorothiophenol, and zinc salts thereof, polysulfides having 2 to 4 sulfur atoms, diphenylpolysulfide, dibenzylpolysulfide, dibenzoylpolysulfide, dibenzothiazoylpolysulfide, and dithiobenzoylpolysulfide. Of these examples, zinc salt of pentachlorothiophenol and diphenyldisulfide are preferable.

The organosulfur compound (d) is included in an amount, per 100 parts by weight of the base rubber, of at least 0.1 part by weight, preferably at least 0.2 part by weight, and most preferably at least 0.5 part by weight, but not more than 5 parts by weight, preferably not more than 4 parts by weight, more preferably not more than 3 parts by weight, and most preferably not more than 2 parts by weight. Too much organosulfur compound results in an excessively low hardness, whereas too little makes it impossible to enhance rebound characteristics.

Examples of inorganic fillers that may be used as component (e) include zinc oxide, barium sulfate and calcium carbonate. The inorganic filler (e) is included in an amount, per 100 parts by weight of the base rubber, of at least 5 parts by weight, preferably at least 7 parts by weight, more preferably at least 10 parts by weight, and most preferably at least 13 parts by weight, but not more than 80 parts by weight, preferably not more than 50 parts by weight, more preferably not more than 45 parts by weight, and most preferably not more than 40 parts by weight. Too much or too little inorganic filler makes it impossible to achieve a golf ball having an appropriate weight and good rebound characteristics.

The organic peroxide (f) may be a commercial product, suitable examples of which include Percumil D (manufactured by NOF Corporation), Perhexa 3M (manufactured by NOF Corporation), Perhexa C-40 (manufactured by NOF Corporation) and Luperco 231XL (manufactured by Atochem Co.). Especially, the organic peroxide should preferably be 1,1-bis(tert-butylperoxy)cyclohexane (Perhexa C-40). If necessary, two or more different organic peroxides may be mixed and used together.

The organic peroxide (f) is included in an amount, per 100 parts by weight of the base rubber, of at least 0.1 part by weight, preferably at least 1.0 part by weight, more preferably at least 2.0 parts by weight, but not more than 7.0 parts by weight, preferably not more than 6.0 parts by weight, more preferably not more than 5.0 parts by weight. Too much or too little organic peroxide makes it impossible to achieve a ball having a good hardness distribution, i.e., feel upon impact, good durability and rebound characteristics.

If necessary, the rubber composition may also include an antioxidant, suitable examples of which include such commercial products as Nocrac NS-6, Nocrac NS-30 (both made by Ouchi Shinko Chemical Industry Co., Ltd.), and Yoshinox 425 (made by API Corporation.). The use of such an antioxidant in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight, is desirable for achieving good rebound characteristics and durability.

The hot-molded product of the invention can be produced by vulcanizing and curing the above-described rubber composition using a method like that employed with known rubber compositions for golf balls. For example, vulcanization may be carried out at a temperature of 100 to 200° C. for a period of 10 to 40 minutes.

In the practice of the invention, it is critical for the hot-molded product to have a hardness difference, expressed as the JIS-C hardness at the surface of the molded product minus the JIS-C hardness at the center of the molded product, of more than 20, preferably at least 23, more preferably at least 28, and most preferably at least 33 JIS-C hardness units, but not more than 40, preferably not more than 35, more preferably not more than 30, even more preferably not more than 25, and most preferably not more than 23 JIS-C hardness units. The hardness adjustment of the hot-molded product, combined with the aforementioned optimization of the material itself, endows a golf ball with both a soft feel upon impact and good rebound characteristics can be reliably obtained.

It is recommended that the foregoing hot-molded product, regardless of which of the subsequently described solid golf ball constructions in which it is used, have a deflection, when subjected to a load of 980 N (100 kg), of at least 2.0 mm, preferably at least 2.5 mm, more preferably at least 2.8 mm, and most preferably at least 3.2 mm, but not more than 6.0 mm, preferably not more than 5.5 mm, more preferably not more than 5.0 mm, and most preferably not more than 4.5 mm. Too small a deformation may worsen the feel of the ball upon impact and, particularly on long shots such as with a driver in which the ball incurs a large deformation, may subject the ball to an excessive rise in spin, reducing the carry. On the other hand, if the hot-molded product is too soft, the solid golf ball tends to have a dead feel when hit, an inadequate rebound that results in a poor carry, and a poor durability to cracking with repeated impact.

The solid golf ball of the invention includes as an essential component the above-described hot-molded product, but the construction of the ball is not subject to any particular limitation. Examples of suitable solid golf ball constructions include one-piece golf balls in which the hot-molded product itself is used directly as the golf ball, two-piece solid golf balls wherein the hot-molded product serves as a solid core on the surface of which a cover has been formed, multi-piece solid golf balls made of three or more pieces in which the hot-molded product serves as a solid core over which a cover composed of two or more layers has been formed.

In the practice of the invention, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, even more preferably not more than 40.0 mm, and most preferably not more than 39.5 mm. In particular, it is desirable for such a solid core in a two-piece solid golf ball to have a diameter of at least 37.0 mm, preferably at least 37.5 mm, even more preferably at least 38.0 mm, and most preferably at least 38.5 mm, but not more than 41.0 mm, preferably not more than 40.5 mm, and most preferably not more than 40.0 mm. Similarly, it is desirable for such a solid core in a three-piece solid golf ball to have a diameter of at least 30.0 mm, preferably at least 32.0 mm, more preferably at least 34.0 mm, and most preferably at least 35.0 mm, but not more than 40.0 mm, preferably not more than 39.5 mm, and most preferably not more than 39.0 mm.

It is also recommended that the solid core have a specific gravity of at least 0.9, preferably at least 1.0, and most preferably at least 1.1, but not more than 1.4, preferably not more than 1.3, and most preferably not more than 1.2.

When the solid golf ball of the invention is a two-piece solid golf ball or a multi-piece solid golf ball, use may be made of known cover and intermediate layer materials. These materials may be primarily composed of, for example, a thermoplastic or thermoset polyurethane elastomer, polyester elastomer, ionomer resin, polyolefin elastomer or mixture thereof. Any one or mixture of two or more thereof may be used, although the use of a thermoplastic polyurethane elastomer or ionomer resin is especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295 and Pandex T8290 (all manufactured by DIC Bayer Polymer, Ltd.). Illustrative examples of suitable commercial ionomer resins include Surlyn 6320, Surlyn 7930 and Surlyn 8120 (both products of E.I. du Pont de Nemours and Co., Inc.), and Himilan 1706, Himilan 1605, Himilan 1855, Himilan 1601 and Himilan 1557 (all products of DuPont-Mitsui Polychemicals Co., Ltd.).

Together with the primary material described above, the cover material may include also, as an optional material, polymers (e.g., thermoplastic elastomers) other than the foregoing. Specific examples of polymers that may be included as optional constituents include polyamide elastomers, styrene block elastomers, hydrogenated polybutadienes and ethylene-vinyl acetate (EVA) copolymers.

Two-piece solid golf balls and multi-piece solid golf balls according to the invention can be manufactured by a known method. No particular limitation is imposed on the manufacturing method, although two-piece and multi-piece solid golf balls are preferably manufactured by employing a method in which the above-described hot-molded product is placed as the solid core within a given injection mold, following which a predetermined method is used to inject the above-described cover material over the core in the case of a two-piece solid golf ball, or to successively inject the above-described intermediate layer material and cover material in the case of a multi-piece solid golf ball. In some cases, the golf ball may be produced by molding the cover material under an applied pressure.

It is recommended that the intermediate layer in a multi-piece solid golf ball have a thickness of at least 0.5 mm, and preferably at least 1.0 mm, but not more than 3.0 mm, preferably not more than 2.5 mm, more preferably not more than 2.0 mm, and most preferably not more than 1.7 mm.

Moreover, in both two-piece solid golf balls and multi-piece solid golf balls, it is recommended that the cover have a thickness of at least 0.7 mm and preferably at least 1.0 mm, but not more than 3.0 mm, preferably not more than 2.5 mm, more preferably not more than 2.0 mm, and most preferably not more than 1.6 mm.

The golf ball of the invention can be manufactured for competitive use by imparting the ball with a diameter and weight which conform with the Rules of Golf; that is, a diameter of at least 42.67 mm and a weight of not more than 45.93 g. It is recommended that the diameter be no more than 44.0 mm, preferably no more than 43.5 mm, and most preferably no more than 43.0 mm; and that the weight be at least 44.5 g, preferably at least 45.0 g, more preferably at least 45.1 g, and most preferably at least 45.2 g.

The solid golf balls of the invention have a soft feel upon impact and excellent rebound characteristics. Moreover, the solid golf balls are improved in flight performance by making its spin rate reduced when shot with a driver.

EXAMPLES

The following Examples and Comparative Examples are provided to illustrate the invention, and are not intended to limit the scope thereof.

Examples 1-7 & Comparative Examples 1-4

The core materials shown in Table 1 were formulated. The rubber compositions thus constituted were blended in a kneader or on a roll mill, then pressure molded under the vulcanizing conditions shown in Table 1 to form solid cores.

TABLE 1

| | | Example | | | | | | | Comparative Example | | | |
| --- | --- | --- | --- | --- | --- | --- | --- | --- | --- | --- | --- | --- |
| | | 1 | 2 | 3 | 4 | 5 | 6 | 7 | 1 | 2 | 3 | 4 |
| Polybutadiene | BR730 | 100 | 100 | 100 | 100 | 100 | 100 | 100 | 100 | 100 | 100 | 100 |
| | BR01 | | | | | | | | | | | 100 |

TABLE 1-continued

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Zinc acrylate | | 38 | 34 | 31 | 45 | 41 | 37 | 44 | 44 | 31 | 27.5 | 45 |
| Zinc oxide | | 17.8 | 18.2 | 20.4 | 14.1 | 15.7 | 17.3 | 14.2 | 14.1 | 22.8 | 23.7 | 14.1 |
| Zinc stearate | | 5 | 5 | 5 | 5 | 5 | 5 | 5 | 5 | 5 | 5 | 5 |
| Zinc salt of pentachlorothiophenol | | 2 | 2 | 2 | 2 | 2 | 2 | 2 | 2 | 0.2 | 0.2 | 2 |
| 2,2'-methylene-bis (4-methyl-6-t-butylphenol) | | 0 | 0 | 0 | 0 | 0 | 0 | 0 | 0 | 0.1 | 0.1 | 0 |
| Sulfur | | 0.1 | 0.1 | 0.1 | 0.1 | 0.1 | 0.1 | 0.1 | 0 | 0 | 0 | 0.1 |
| Dicumyl peroxide | | 1.2 | 1.2 | 1.2 | 0 | 0 | 0 | 0 | 0 | 0.3 | 0.3 | 0 |
| 1,1-bis-(tert butylperoxy) cyclohexane 40% dilution | | 1.2 | 1.2 | 1.2 | 3 | 3 | 3 | 3 | 3 | 0.3 | 0.3 | 3 |
| Total amount | | 165 | 163 | 161 | 159 | 167 | 164 | 168 | 168 | 160 | 157 | 159 |
| Vulcanization | Temp. (° C.) | 175 | 175 | 175 | 155 | 155 | 155 | 155 | 155 | 155 | 155 | 155 |
| | Time (min) | 15 | 15 | 15 | 15 | 15 | 15 | 15 | 15 | 15 | 15 | 15 |

Remarks: The figures in Table 1 denote "parts by weight".

The trade names of the main materials shown in Table 1 are as follows.

Polybutadiene: "BR730"
  Nd based catalyst,
  cis-1,4 content 96%,
  Mooney viscosity ($ML_{1+4}$ (100° C.)) 55%,
  Viscosity (η) as a 5 wt % solution in toluene, 403 mPa·s, made by JSR Corporation Polybutadiene: "BR01"
  Ni based catalyst,
  cis-1,4 content 96%,
  Mooney viscosity ($ML_{1+4}$ (100° C.)) 43%,
  Viscosity (η) as a 5 wt % solution in toluene, 150 mPa·s, made by JSR Corporation Zinc acrylate: The product is made by Nihon Jyoryu Co., Ltd.
Zinc oxide: The product is made by Sakai Chemical Co., Ltd.
Zinc stearate: The product is made by NOF Corporation.
Zinc salt of pentachlorothiophenol
2,2'-methylene-bis(4-methyl-6-t-butylphenol):
  The trade name is "Nocrac NS-6" produced by Ouchi Shinko Chemical Industry Co., Ltd.
Sulfur powder: The trade name is Sulfur "Z" made by Tsurumi Chemical Industry Corporation
Dicumyl peroxide: The trade name is "Percumyl D" manufactured by NOF Corporation.
1,1-bis(t-butylperoxy)cyclohexane 40% diluted product, The trade name is "Perhexa C-40" ($SiO_2$, $CaCO_3$, 40% diluted product) made by NOF Corporation.

The resulting solid cores were tested as described below to determine their deformation under 980 N (100 kg) loading and their rebound. The results are shown in Table 2.

Deformation Under 980 N Loading

Measured as the deflection (mm) of the solid core when subjected to a load of 980 N (100 kg).

Surface Hardness and Center Hardness

The both hardness is measured by JIS-C hardness meter.
Surface hardness denotes the average when two points of the surface of the core are measured randomly.
Center hardness denotes the average of the hardness of the center parts in cross section of two halves when the core is cut in half.

Initial Velocity

The initial velocity (m/s) is measured when hit with a driver (W#1), hitting machine at a head speed of 50 m/s.

TABLE 2

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Solid Core Performance | Outer diameter (mm) | 37.3 | 37.4 | 37.4 | 37.3 | 37.4 | 37.3 | 37.3 | 37.3 | 37.3 | 37.3 | 37.3 |
| | Weight (g) | 32.0 | 32.2 | 32.0 | 31.8 | 31.8 | 31.9 | 31.8 | 31.8 | 32.0 | 31.9 | 31.8 |
| | Deflection (mm) under 980 N load | 2.98 | 3.39 | 3.77 | 3.00 | 3.25 | 3.61 | 3.01 | 2.43 | 2.81 | 3.32 | 3.20 |
| | Surface hardness (JIS-C hardness) | 89.4 | 83.9 | 78.7 | 88.1 | 86.1 | 81.6 | 88.9 | 89.1 | 81.8 | 76 | 88.1 |
| | Center hardness (JIS-C hardness) | 62.4 | 52.4 | 53.2 | 58.8 | 56.8 | 56.8 | 57.8 | 70.1 | 72.4 | 61.8 | 58.8 |
| | The difference of JIS-C hardness | 27 | 31.5 | 25.5 | 29.3 | 29.3 | 24.8 | 31.1 | 19 | 9.4 | 14.2 | 29.3 |

TABLE 2-continued

|  | Example | | | | | | | Comparative Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Initial Velocity (m/s) | 78.0 | 77.8 | 77.7 | 78.0 | 77.9 | 77.8 | 78.0 | 77.6 | 78.5 | 77.9 | 77.5 |

In each example, the resulting solid core was placed in a given mold and ionomer resins (Surlyn 7930 made by DuPont-Mitsui Polychemicals Co., Ltd. Shore D hardness of 64) was injection-molded over the core, thereby producing intermediate layers whose thickness is 1.67 mm. Then, the resulting spherical body consisting of the solid core covering the intermediate layer was placed in a given mold and urethane resins (DIC Bayer Polymer, Ltd. Shore D hardness of 54) was injection-molded over the spherical body, thereby forming a cover having a thickness of 1.0 mm to produce each of three-piece solid golf balls of Examples and Comparative Examples. The properties of the resulting golf balls were determined as described below. The results are shown in Table 3.

Flying Performance

Each ball sample was tested for flying performance by measuring carry and the total flying distance which it traveled when it was hit at a head speed (HS) of 50 m/s by a driver attached to a swing robot made by Miyamae Co., Ltd. (The driver is X-Drive Type 300, Prospec, with a loft angle of 10°, made by Bridgestone Sports Co., Ltd.) The spin and initial velocity were measured immediately after hitting by using a high-speed camera.

Feel

Each ball sample was evaluated for feel when ten amateur golfers hit with a driver (The driver is X-Drive Type 300, Prospec, with a loft angle of 10°, made by Bridgestone Sports Co., Ltd.) by tee up of the ball. The feel of the ball was evaluated in accordance with the numbers felt "soft", which is described below.

When one to three amateur golfers felt "soft", the evaluation is judged as "poor".

When four to six amateur golfers felt "soft", the evaluation is judged as "ordinary".

When seven to nine amateur golfers felt "soft", the evaluation is judged as "good".

When ten amateur golfers felt "soft", the evaluation is judged as "very good".

TABLE 3

|  |  | Example | | | | | | | Comparative Example | | | |
| --- | --- | --- | --- | --- | --- | --- | --- | --- | --- | --- | --- | --- |
|  |  | 1 | 2 | 3 | 4 | 5 | 6 | 7 | 1 | 2 | 3 | 4 |
| Golf ball properties | Outer diameter (mm) | 42.67 | 42.68 | 42.67 | 42.66 | 42.67 | 42.67 | 42.67 | 42.67 | 42.67 | 42.67 | 42.7 |
|  | Weight (g) | 45.31 | 45.31 | 45.24 | 45.05 | 45.05 | 45.05 | 45.05 | 45.05 | 45.41 | 45.33 | 45.1 |
|  | Deflection (mm) under 980 N load | 2.23 | 2.48 | 2.72 | 2.21 | 2.40 | 2.80 | 2.21 | 2.02 | 2.23 | 2.58 | 2.59 |
|  | Initial velocity (m/s) | 72.8 | 72.4 | 72.1 | 72.8 | 72.6 | 72.2 | 72.7 | 72.0 | 72.7 | 72.3 | 72.0 |
|  | Launch angle | 10.9 | 10.9 | 10.7 | 10.9 | 10.9 | 10.7 | 10.9 | 10.7 | 10.8 | 11.0 | 10.7 |
|  | Spin rate (rpm) | 2434 | 2347 | 2380 | 2437 | 2398 | 2322 | 2428 | 2519 | 2435 | 2292 | 2402 |
|  | Carry (m) | 243.9 | 241.8 | 241.6 | 242.9 | 241.4 | 240.4 | 240.1 | 237.1 | 240.3 | 238.1 | 236.7 |
|  | Total (m) | 257.0 | 254.4 | 252.8 | 256.4 | 255.4 | 255.8 | 253.4 | 250.1 | 252.8 | 252.8 | 250 |
|  | Feel | good | good | very good | good | good | very good | good | ordinary | ordinary | good | good |

The invention claimed is:

1. A method for manufacturing a solid golf ball comprising a hot-molded product of a rubber composition, said method comprising the steps of:
   vulcanizing and curing the rubber composition, wherein the rubber composition comprises
   (a) 100 parts by weight of a polybutadiene synthesized using a rare-earth catalyst and having a cis-1,4 content of at least 60% and a 1,2 vinyl content of at most 2%, having a viscosity $\eta$ at 25° C. as a 5 wt % solution in toluene of up to 600 mPa·s, and having Mooney viscosity ($ML_{1+4}$ (100° C.)) of more than 30,
   (b) 0.01 to 0.5 parts by weight of a sulfur,
   (c) 10 to 60 parts by weight of an unsaturated carboxylic acid and/or a metal salt thereof,
   (d) 0.1 to 5 parts by weight of an organosulfur compound,
   (e) 5 to 80 parts by weight of an inorganic filler, and
   (f) 0.1 to 5 parts by weight of an organic peroxide,
   wherein the organic peroxide is 1,1-bis(tert-butylperoxy)cyclohexane, the 1,1-bis(tert-butylperoxy)cyclohexane is the only organic peroxide of the rubber composition, the vulcanization is carried out at a temperature of 100 to 155° C., and the hot-molded product has a difference in JIS-C hardness between the center and surface thereof of more than 20 and up to 40.

2. The method of claim 1, wherein the amount of (f) the organic peroxide is 1.2 to 3.0 parts by weight per 100 parts by weight of the polybutadiene.

* * * * *